(12) United States Patent
Kobori et al.

(10) Patent No.: US 12,743,002 B2
(45) Date of Patent: Sep. 22, 2026

(54) FINDER DEVICE

(71) Applicant: FUJIFILM Corporation, Tokyo (JP)

(72) Inventors: Makoto Kobori, Saitama (JP); Shunsuke Miyagishima, Saitama (JP); Hiroki Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 833 days.

(21) Appl. No.: 18/178,318

(22) Filed: Mar. 3, 2023

(65) Prior Publication Data

US 2023/0324767 A1 Oct. 12, 2023

(30) Foreign Application Priority Data

Mar. 25, 2022 (JP) ................................ 2022-050621

(51) Int. Cl.
*G03B 13/06* (2021.01)
*G02B 15/14* (2006.01)

(52) U.S. Cl.
CPC ........... *G03B 13/06* (2013.01); *G02B 15/142* (2019.08)

(58) Field of Classification Search
CPC ....... G03B 13/00; G03B 13/06; G02B 15/142
See application file for complete search history.

(56) References Cited

U.S. PATENT DOCUMENTS 6,169,859 B1 1/2001 Omiya
8,575,051 B2 * 11/2013 Ludtke .................. C04B 35/634 501/90
2013/0201378 A1 8/2013 Sheu

FOREIGN PATENT DOCUMENTS

JP H04-330870 A 11/1992
JP H11-190869 A 7/1999
JP H11-218805 A 8/1999
JP 2004-109961 A 4/2004
WO WO-2021181926 A1 * 9/2021 ............. H04N 23/00

OTHER PUBLICATIONS

An Office Action; "Notice of Reasons for Refusal," mailed by the Japanese Patent Office on Aug. 20, 2025, which corresponds to Japanese Patent Application No. 2022-050621 and is related to U.S. Appl. No. 18/178,318; with English language translation.

* cited by examiner

*Primary Examiner* — Minh Q Phan
(74) *Attorney, Agent, or Firm* — Studebaker Brackett PLLC

(57) ABSTRACT

Provided is a finder device capable of preventing dust on a display surface of a display element and reducing an influence of heat which is generated from the display element on an optical system. An electronic view finder (EVF) includes: an optical system that includes a display element, a first lens group disposed in order from the display element side, and a second lens group; a first holding frame that holds the display element and the first lens group to seal a space between the display element and the first lens group; a second holding frame that holds the second lens group; and a diopter adjustment unit that adjusts a diopter by integrally moving the display element and the first lens group relative to the second lens group.

13 Claims, 2 Drawing Sheets

FINDER DEVICE

CROSS-REFERENCE TO RELATED APPLICATION

The present application claims priority under 35 U.S.C § 119(a) to Japanese Patent Application No. 2022-050621 filed on Mar. 25, 2022, which is hereby expressly incorporated by reference, in its entirety, into the present application.

BACKGROUND OF THE INVENTION

1. Field of the Invention

The present invention relates to a finder device, and more particularly to an electronic finder device that has a function of adjusting diopter.

2. Description of the Related Art

JP1992-330870A (JP-H04-330870A) describes a technique of disposing a concave lens between a display unit and an eyepiece portion in a finder having the display unit and the eyepiece portion to reduce the total length. Further, JP1992-330870A (JP-H04-330870A) describes that the image display surface of the display unit is protected from dust by sealing the display unit with a concave lens.

JP1999-190869A (JP-H11-190869A) describes a finder comprising a liquid crystal display, a magnifying lens that magnifies an image displayed on the liquid crystal display, and a lens for diopter adjustment.

SUMMARY OF THE INVENTION

An embodiment according to a technique of the present disclosure provides a finder device capable of preventing dust on a display surface of a display element and reducing an influence of heat which is generated from the display element on an optical system.

(1) A finder device comprising: a display element; an optical system that includes at least a first lens group and a second lens group in order from a side of the display element; a first lens group holding member that holds the first lens group to seal a space between the display element and the first lens group; a second lens group holding member that holds the second lens group; and a diopter adjustment unit that adjusts a diopter by integrally moving the display element and the first lens group relative to the second lens group.

(2) The finder device according to (1), in which the first lens group holding member and the second lens group holding member are thermally separated from each other.

(3) The finder device according to (2), in which the first lens group holding member and the second lens group holding member are spatially separated and thermally separated.

(4) The finder device according to any one of (1) to (3), in which in the first lens group, a lens closest to the side of the display element satisfies the following conditional expression.

$$0.1<|dL1-dL1H|\times\rho1/OH8<1$$

Here, dL1 is a thickness of the lens on an optical axis,

OH8 is a value of 40% of a maximum length of an image display region of the display element, dL1H is a thickness of the lens in an optical axis direction at a height of OH8 from the optical axis, and ρ1 is a linear expansion coefficient ($10^{-5}$/K) of the lens.

(5) The finder device according to any one of (1) to (4), in which the first lens group satisfies the following conditional expression.

$$0.001<|f20-f40|/fe<0.05$$

Here, f20 is a focal length of the first lens group at a temperature of 20 degrees, f40 is a focal length of the first lens group at a temperature of 40 degrees, and fe is a composite focal length of the first lens group and the second lens group in a case where a temperature is 20 degrees and a diopter is −1 dpt.

(6) The finder device according to any one of (1) to (5), in which the first lens group satisfies the following conditional expression.

$$0.15<doL1/fe<0.4$$

Here, doL1 is a distance on an optical axis from a display surface of the display element to an apex of a surface of the first lens group on the side of the display element.

(7) The finder device according to any one of (1) to (6), further comprising a heat discharging member that comes into contact with the display element within a movable range of the display element to discharge heat of the display element.

(8) The finder device according to (7), in which the heat discharging member satisfies the following conditional expression.

$$jA>200$$

Here, jA is a thermal conductivity of the heat discharging member.

(9) The finder device according to (7) or (8), in which the heat discharging member is composed of a band-like body which has flexibility and of which one end is connected to the display element.

(10) The finder device according to (9), in which the heat discharging member is provided on a flexible printed circuit which is connected to the display element.

(11) The finder device according to any one of (1) to (10), in which a member, which is interposed between the display element and the first lens group, satisfies the following conditional expression.

$$jFave<0.5$$

Here, jFave is an average value of thermal conductivities of the member which is interposed between the display element and the first lens group.

(12) The finder device according to any one of (1) to (11), in which the first lens group holding member holds the display element.

(13) The finder device according to (12), in which the diopter adjustment unit adjusts a diopter by moving the first lens group holding member relative to the second lens group holding member.

(14) The finder device according to (13), in which the diopter adjustment unit includes a guiding unit that guides movement of the first lens group holding member, and the guiding unit is provided in the second lens group holding member.

DESCRIPTION OF THE PREFERRED EMBODIMENTS

Hereinafter, preferred embodiments of the present invention will be described in detail with reference to the accompanying drawings.

Configuration

Here, a case where the present invention is applied to an electronic view finder (EVF) of the digital camera (for example, a mirrorless camera) will be described as an example. EVF is an example of the finder device.

Figure 1:
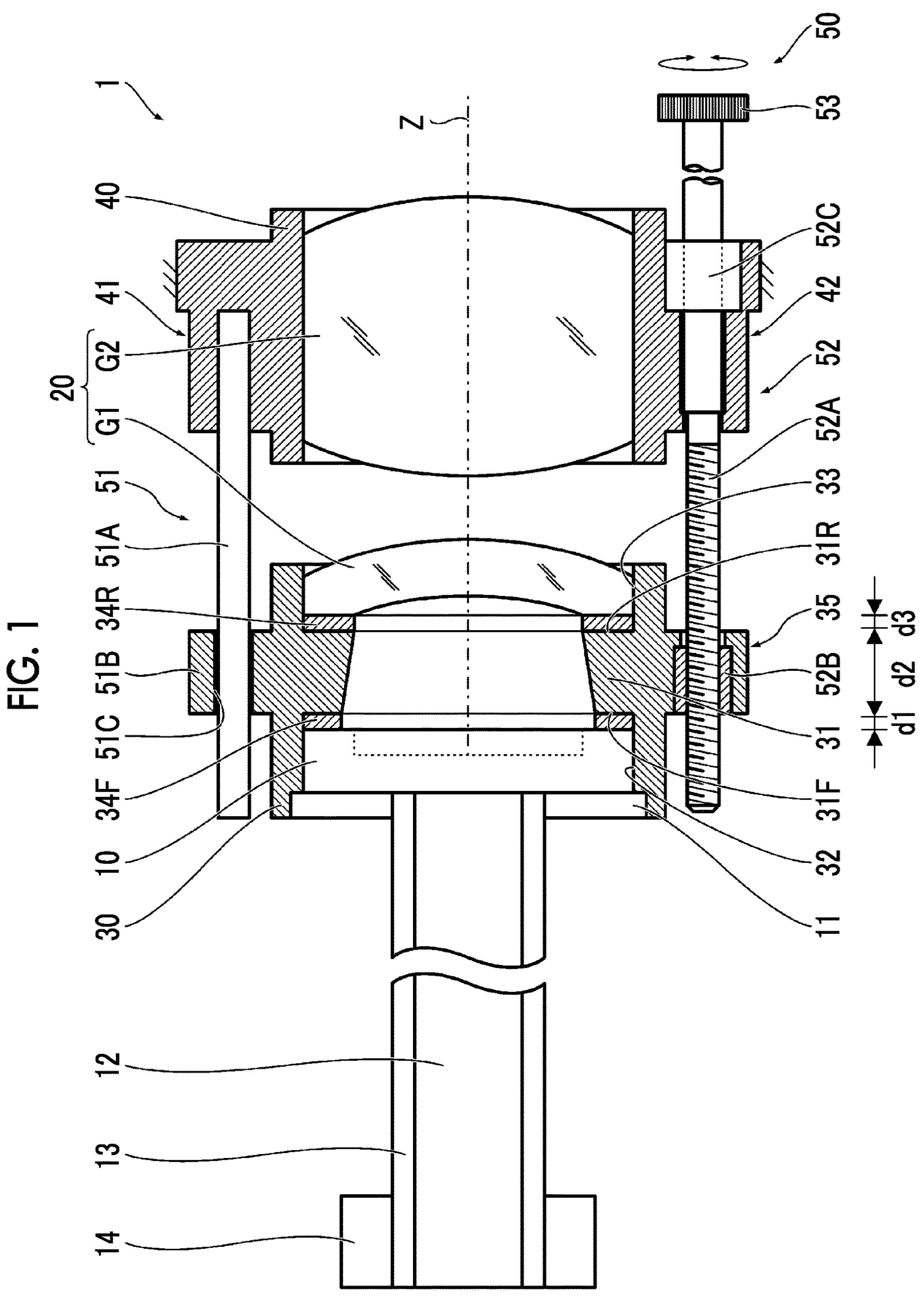
FIG. 1 is a cross-sectional view showing an embodiment of an EVF to which the present invention is applied.

FIG. 1 is a cross-sectional view showing an embodiment of the EVF to which the present invention is applied.

In the following description, for convenience of explanation, the left side of FIG. 1 is assumed as the front side of EVF 1, and the right side of FIG. 1 is assumed as the rear side of EVF 1 to distinguish the directions.

As shown in the drawing, the EVF 1 according to the present embodiment includes a display element 10 that displays an image, an optical system 20 that magnifies an image displayed on the display element 10 to observe the image, and a diopter adjustment unit 50 that adjusts a diopter.

The display element 10 is composed of, for example, an organic EL display (organic light emitting diode: OLED). In addition to the OLED, a liquid crystal display (LCD) or the like can also be employed as the display element 10.

In FIG. 1, a band-like member represented by the reference numeral 12 is a flexible printed circuit (FPC) extending from the display element 10. As will be described later, in the EVF 1 according to the present embodiment, the display element 10 moves during the diopter adjustment. Therefore, the display element 10 is connected to a control substrate (main board or the like) of the digital camera through the FPC 12 which is flexible.

In the present embodiment, the FPC 12 comprising a graphite sheet 13 is used. The graphite sheet 13 is formed by processing black lead (graphite) into a sheet shape and has a high thermal conductivity (approximately 230 to 400 [W/mk]). By using the FPC 12 comprising the graphite sheet 13, heat which is generated from the display element 10 can be guided to a FPC 12 side. That is, the FPC 12 is able to function as a heat sink. In the present embodiment, the flexible band-like graphite sheet 13 is laminated and disposed on one surface of the FPC 12. The graphite sheet 13 is an example of a heat discharging member composed of a band-like body which is flexible.

The FPC 12 is composed of, for example, a single-sided FPC. That is, the FPC 12 has a configuration in which a conductive metal such as a copper foil is cemented to one surface of a base film (for example, polyimide).

The distal end of the FPC 12 is fixed relative to a bracket 14 which is provided on the camera body. In the present embodiment, the bracket 14 is made of metal and is composed of, for example, a copper plate.

The optical system 20 includes a first lens group G1 and a second lens group G2 that are sequentially disposed along an optical axis Z from a side (front side) of the display element 10. The first lens group G1 and the second lens group G2 each are composed of at least one lens. An optical component constituting the first lens group G1 and the second lens group G2 may include a lens having substantially no refractive power. Further, an optical component other than the lens, such as a stop, a filter, and a cover glass, may be included. For example, in the present embodiment, the first lens group G1 is composed of one lens, and the second lens group G2 is composed of a plurality of lenses. It should be noted that, in FIG. 1, for convenience, the second lens group G2 is shown as a single lens. A material of the lens is not particularly limited. For example, in the present embodiment, a lens (PC lens) made of a resin, for example, a polycarbonate (PC) is used.

In the EVF 1 according to the present embodiment, the diopter adjustment is performed by integrally moving the display element 10 and the first lens group G1 along the optical axis Z relative to the second lens group G2. Therefore, different holding frames hold the first lens group G1 and the second lens group G2. That is, the lens groups are held in the holding frames that are spatially separated. Specifically, the first holding frame 30 holds the first lens group G1 together with the display element 10, and the second holding frame 40 holds the second lens group G2 alone. In the present embodiment, the first holding frame 30 is used as an example of the first lens group holding member, and the second holding frame 40 is used as an example of the second lens group holding member of the second holding member.

The first holding frame 30 has a partition wall 31 therein. The first holding frame 30 has a display element holding part 32 that holds the display element 10 on the front side and a first lens group holding part 33 that holds the first lens group G1 on the rear side, with the partition wall 31 interposed therebetween.

The partition wall 31 has a frame-like shape which has an opening at the center, and is disposed orthogonal to the optical axis Z. The front side edge surface 31F and the rear side edge surface 31R of the partition wall 31 are composed of surfaces orthogonal to the optical axis Z, respectively.

The display element holding part 32 is configured as a recess into which the display element 10 is fitted. The display element 10 is positioned and mounted on the first holding frame 30 by being fitted into the display element holding part 32. The display element 10 is mounted on the frame 11 and is assembled to the first holding frame 30. The display element 10 is fixed relative to the first holding frame 30 by fixing the frame 11 to the first holding frame 30 with a screw (not shown in the drawing). Further, the display element 10 is attached to the front side edge surface 31F of the partition wall 31 through a double-sided tape 34F. More specifically, the double-sided tape 34F is adhered along the peripheral edge thereof, and is attached to the front side edge surface 31F of the partition wall 31 through the double-sided tape 34F.

The first lens group holding part 33 is configured as a recess into which the first lens group G1 is fitted. The first lens group G1 is positioned and mounted on the first holding frame 30 by being fitted into the first lens group holding part 33. The first lens group G1 is attached to the partition wall 31 through the double-sided tape 34R. More specifically, the double-sided tape 34R is bonded along the peripheral edge and is attached to the edge surface of the partition wall 31.

By assembling the display element 10 and the first lens group G1 onto the first holding frame 30 as described above, a space between the display element 10 and the first lens group G1 is sealed. Thereby, the image display surface of the display element 10 is able to be dustproof. It should be noted that the term "sealing" here is intended to be at a level at which dust does not pass, and permeation at a molecular level of oxygen or the like is allowed.

In the present embodiment, the first holding frame 30 is made of a resin and is composed of, for example, a glass fiber reinforced PC (for example, a PC which has a composition of glass fiber 30%). Further, the frame 11 is made of metal and is composed of, for example, stainless steel (for example, SUS304). The base material of the double-sided tapes 34F and 34R is made of a resin and is composed of, for example, polyethylene terephthalate (PET).

The second holding frame 40 positions and holds the second lens group G2 on the inner peripheral portion thereof. The second holding frame 40 is made of a resin like the first holding frame 30, and is composed of, for example, a glass fiber reinforced PC (for example, a PC which has a composition of glass fiber of 30%).

The diopter adjustment unit 50 adjusts a diopter by integrally moving the display element 10 and the first lens group G1 along the optical axis Z relative to the second lens group G2. As described above, in the EVF 1 according to the present embodiment, the second holding frame 40 holds the second lens group G2, and the first holding frame 30 holds the display element 10 and the first lens group G1. Therefore, in the EVF 1 according to the present embodiment, the diopter adjustment unit 50 adjusts a diopter by moving the first holding frame 30 relative to the second holding frame 40 along the optical axis Z.

As shown in FIG. 1, the diopter adjustment unit 50 includes a guiding unit 51 that guides movement of the first holding frame 30, and a driving unit 52 that moves the first holding frame 30.

The guiding unit 51 includes a guiding rod 51A and a sliding portion 51B that slides along the guiding rod 51A.

One end of the guiding rod 51A is supported by a shaft supporting unit 41 provided in the second holding frame 40 and is disposed in parallel with the optical axis Z. In the present embodiment, the guiding rod 51A is made of metal and is composed of, for example, stainless steel (for example, SUS304).

The sliding portion 51B is integrally provided on the first holding frame 30. The sliding portion 51B has a guiding hole 51C into which the guiding rod 51A is inserted.

The first holding frame 30 is movably supported along the optical axis Z by sliding the sliding portion 51B along the guiding rod 51A.

The driving unit 52 is composed of a so-called lead screw mechanism, and includes a screw rod 52A, a nut member 52B screw-coupled to the screw rod 52A, and a click mechanism 52C for clicking-stopping the screw rod 52A.

The screw rod 52A is rotatably supported by a screw rod supporting portion 42 provided in the second holding frame 40 and is disposed in parallel with the optical axis Z. A diopter adjustment dial 53 is connected to the screw rod 52A. In a case where the EVF 1 is assembled to a camera body (not shown in the drawing), a part or all of the diopter adjustment dial 53 is disposed to be exposed on an outer surface of the camera body. A user rotates the diopter adjustment dial 53 to rotate the screw rod 52A.

The nut member 52B is held by a nut holding part 35 provided in the first holding frame 30 and is disposed in parallel with the optical axis Z. In the present embodiment, the screw rod 52A and the nut member 52B are made of metal and are composed of, for example, stainless steel (for example, SUS304).

The click mechanism 52C is provided in the second holding frame 40. The click mechanism 52C causes the screw rod 52A to be click-stopped at a certain rotation angle interval. Since the click mechanism itself has a known configuration, details thereof will not be described. For example, the click mechanism 52C is composed of a groove disposed on a peripheral surface of the screw rod 52A at a certain angle interval, a sphere fitted in the groove, and a spring for urging the sphere toward the groove.

In the diopter adjustment unit 50 configured as described above, by rotating the diopter adjustment dial 53, the first holding frame 30 moves along the optical axis Z in accordance with a rotation direction and an amount of rotation thereof. Since the diopter adjustment dial 53 is rotated at the certain rotation angle interval by the click mechanism 52C, the first holding frame 30 can be moved in a certain step.

The EVF 1 according to the present embodiment is configured as described above. The EVF 1 is assembled to the camera body by fixing the second holding frame 40 to a fixing unit of the camera body (not shown in the drawing).

Effects

According to the EVF 1 of the present embodiment, the first holding frame 30 holds the display element 10 and the first lens group G1, and the first lens group G1 seals the image display surface of the display element 10. Thereby, the image display surface of the display element 10 is able to be dustproof.

Further, in the EVF 1 according to the present embodiment, the diopter adjustment is performed by integrally moving the display element 10 and the first lens group G1 relative to the second lens group G2. Accordingly, a total length of the optical system 20 can be reduced.

Further, in the EVF 1 according to the present embodiment, the first holding frame 30 that holds the display element 10 and the first lens group G1 and the second holding frame 40 that holds the second lens group G2 are disposed to be spatially separated from each other. Thereby, it is possible to make it difficult to transfer the heat which is generated from the display element 10 to the second lens group G2. That is, by disposing the first holding frame 30 and the second holding frame 40 such that the frames are spatially separated, the first holding frame 30 and the second holding frame 40 can also be thermally separated. Thereby, it is possible to make it difficult to transfer the heat between the first holding frame 30 and the second holding frame 40.

Further, according to the EVF 1 of the present embodiment, the FPC 12 comprising the graphite sheet 13 is connected to the rear surface side (the side opposite to the optical system 20) of the display element 10. Thereby, it is possible to make it difficult to transfer the heat which is generated from the display element 10 to the optical system 20. That is, since the heat which is generated from the display element 10 is guided to the rear surface side of the display element 10 by the graphite sheet 13, it is possible to make it difficult to transfer the heat to the optical system 20.

Since the graphite sheet 13 is provided in the FPC 12, the graphite sheet 13 is able to constantly be in contact with the display element 10 even in a case where the display element 10 moves. That is, the graphite sheet 13 can constantly be brought into contact with the display element 10 within the movable range of the display element 10. Further, space saving can be realized by integrating the graphite sheet 13 with the FPC 12. In addition, a configuration may be adopted in which the graphite sheet alone is mounted on the display element 10 without being integrated with the FPC 12. Further, in the present embodiment, the graphite sheet is used as the heat discharging member, but the member used as the heat discharging member is not limited thereto. Further, the heat discharging member does not necessarily have to have a flexible configuration. Any configuration may be used as long as the heat discharging member is able to come into contact with the display element 10 within the movable range of the display element 10.

Preferable Configuration of Each Element Configuration of First Lens Group First Lens Group $$|dL1-dL1H| \times \rho 1/OH8 \quad (1)$$

In the first lens group G1, it is preferable that the lens closest to the side of the display element satisfies the following conditional expression.

$$0.1<|dL1-dL1H| \times \rho 1/OH8<1 \quad \text{Conditional Expression (1)}$$

Here, dL1 is a thickness of the lens on an optical axis, OH8 is a value of 40% of a maximum length of an image display region of the display element 10 (so-called 80% object height), dL1H is a thickness of the lens in an optical axis direction at a height of OH8 from the optical axis, and ρ1 is a linear expansion coefficient ($10^{-5}$/K) of the lens.

By making the value of |dL1-dL1H|×ρ1/OH8 greater than the lower limit of the above-mentioned conditional expression, an appropriate aberration correction effect can be given to the first lens group G1 and fluctuation in aberration during diopter adjustment can be suppressed. Further, by making the value less than the upper limit, fluctuation in aberration in a case where temperature changes can be suppressed.

In a case where one lens constitutes the first lens group G1, it is necessary for the lens to satisfy the above-mentioned conditional expression.

$$|f20-f40| \quad (2)$$

It is preferable that the first lens group G1 satisfies the following conditional expression.

$$0.001<|f20-f40|/fe<0.05 \quad \text{Conditional Expression (2)}$$

Here, f20 is a focal length of the first lens group G1 at a temperature of 20 degrees, f40 is a focal length of the first lens group G1 at a temperature of 40 degrees, and fe is a composite focal length of the first lens group G1 and the second lens group G2 in a case where the temperature is 20 degrees and the diopter is −1 dpt.

By making the value of |f20−f40| greater than the lower limit of the above-mentioned conditional expression, an appropriate refractive power can be applied to the first lens group G1, and the total length of the optical system 20 can be reduced. Further, by making the value less than the upper limit, it is possible to suppress fluctuation in diopter in a case where the temperature changes.

$$doL1/fe \quad (3)$$

It is preferable that the first lens group G1 satisfies the following conditional expression.

$$0.15<doL1/fe<0.4 \quad \text{Conditional Expression (3)}$$

Here, doL1 is a distance on the optical axis from an image display surface of the display element 10 to an apex of a surface of the first lens group G1 on the side of the display element.

By making the value of doL1/fe greater than the lower limit of the above-mentioned conditional expression, it is possible to make it difficult to transfer the heat from the display element 10 to the first lens group G1. Further, the total length of the optical system 20 can be reduced by making the value less than the upper limit.

Heat Discharging Member

It is preferable that the heat discharging member that comes into contact with the display element 10 and discharges the heat of the display element 10 satisfies the following conditional expression.

$$jA>200 \text{ (W/mk)} \quad \text{Conditional Expression (4)}$$

Here, jA is a thermal conductivity of the heat discharging member.

By satisfying the condition, the heat of the display element 10 can be easily transferred to the heat discharging member. Thereby, it is possible to make it difficult to transfer the heat to the optical system 20.

First Holding Frame

It is preferable that the following conditional expression is satisfied for the member which is interposed between the display element 10 and the first lens group G1.

$$jFave<0.5 \text{ (W/mk)} \quad \text{Conditional Expression (5)}$$

Here, jFave is an average value of thermal conductivities of the member which is interposed between the display element 10 and the first lens group G1. In the EVF 1 of the above-mentioned embodiment, the member which is interposed between the display element 10 and the first lens group G1 is the partition wall 31 and the double-sided tapes 34F and 34R.

Assuming that members, which are interposed between the display element 10 and the first lens group G1, are E1, E2, . . . , Ei in order from the front side, thicknesses thereof in the optical axis direction are d1, d2, . . . , di, and thermal conductivities thereof are j1, j2, . . . , ji, the average value jFave of the thermal conductivities is calculated by the following expression.

$$jFave=\{\Sigma(ji*di)\}/dAll$$

i=1, 2, 3, . . .

Here, dAll is a total thickness of the members which are interposed between the display element 10 and the first lens group G1 in the optical axis direction (dAll=d1+d2+ . . . +di).

By satisfying the condition, it is possible to make it difficult to transfer the heat of the display element 10 to the first lens group G1.

In the EVF 1 of the above-mentioned embodiment, assuming that a thickness of the double-sided tape 34F on the front side of the partition wall 31 is d1, a thickness of the partition wall 31 is d2, a thickness of the double-sided tape 34R on the rear side of the partition wall 31 is d3, a thermal conductivity of the double-sided tape 34F on the front side of the partition wall 31 is j1, a thermal conductivity of the partition wall 31 is j2, and a thermal conductivity of the double-sided tape 34R on the rear side of the partition wall 31 is j3, the average value jFave of the thermal conductivities is calculated by the following expression.

$$jFave=(j1*d1+j2*d2+j3*d3)/(d1+d2+d3)$$

Examples

Hereinafter, numerical examples of the optical system of the EVF will be described.

Figure 2:
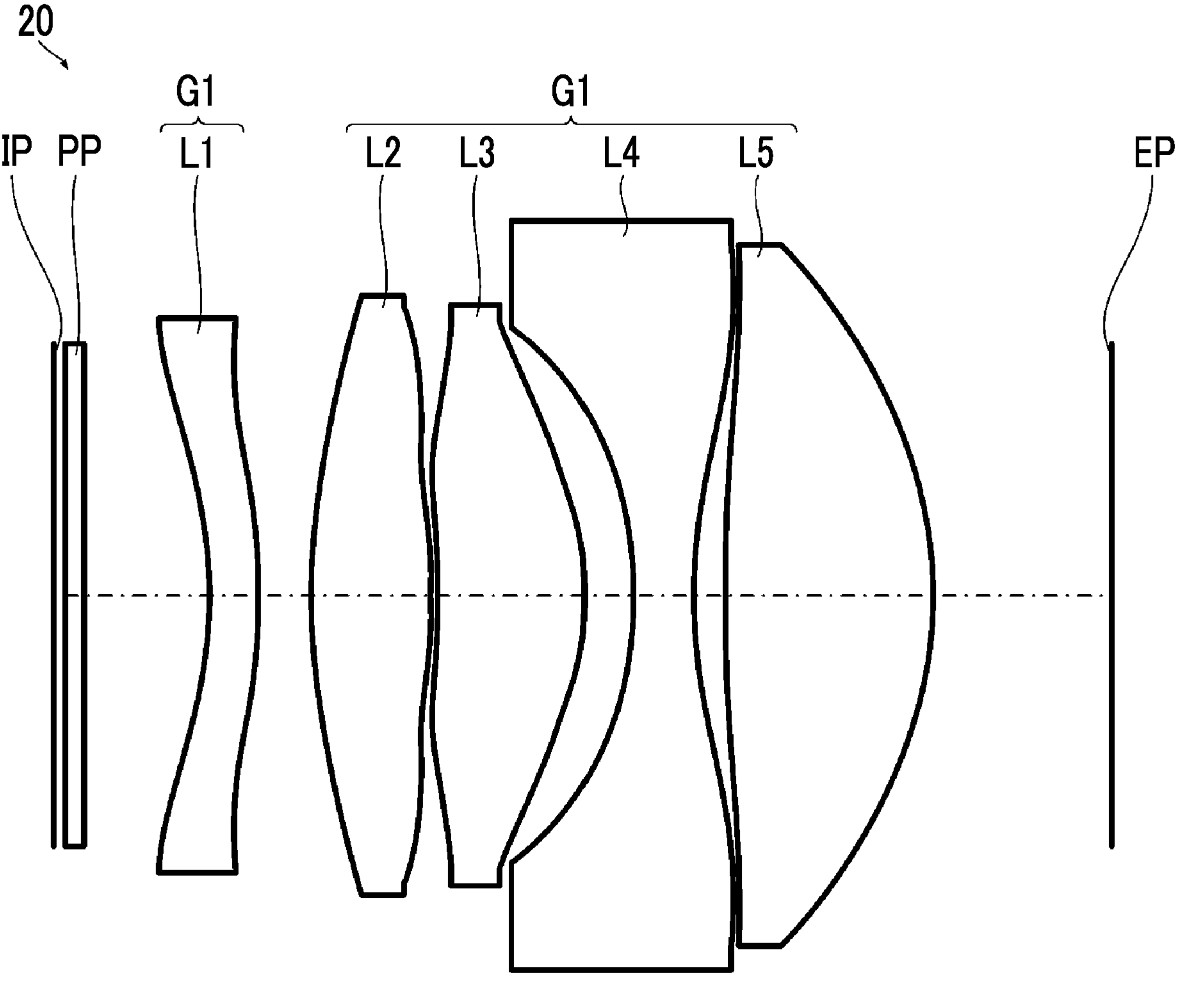
FIG. 2 is a diagram showing an example of an optical system.

FIG. 2 is a diagram showing an example of the optical system. The drawing shows a configuration of the optical system 20 in a cross section including the optical axis. In the drawing, an image display surface IP of the display element is set as an observation object, the left side is the observation object side (display element side), and the right side is the eyepoint side. It should be noted that an eyepoint EP shown in the drawing does not indicate the size and shape, but indicates a position in the optical axis direction.

The optical system 20 shown in the drawing continuously includes an optical member PP, a first lens group G1 and a second lens group G2, sequentially from the side of the display element toward the eyepoint side.

The optical member PP is a parallel plate-like member which is assumed as a protective cover glass, various filters, or the like. Therefore, the optical member PP is not an essential component, and it is possible to make a configuration excluding the optical member PP. The first lens group G1 is composed of one lens L1. The second lens group G2 is composed of four lenses including a lens L2, a lens L3, a lens L4, and a lens L5.

For the optical system 20 of the present example, Table 1 shows basic lens data, Table 2 shows variable surface spacings, and Table 3 shows aspherical coefficients. The basic lens data in Table 1 is at a temperature of 20° C.

In the basic lens data of Table 1, the term "surface number" represents the number (i) of the optical surface in a case of counting from the side of the display element, the term "r" represents a curvature radius of the i-th optical surface (i-th surface), and the term "d" represents a spacing (surface spacing) between the i-th surface and the (i+1)th surface. Further, the term "Nd" represents a refractive index of the medium between the i-th surface and the (i+1)th surface at the d line (a wavelength of)=587.56 nm), and the term "vd" represents an Abbe number of the medium between the i-th surface and the (i+1)th surface at the d line.

In Table 1, the surface number and the term (EP) are described in the column of the surface number of the surface corresponding to the eyepoint EP. Further, in Table 1, regarding the curvature radius, a sign of the curvature radius of the surface that is convex toward the side of the display element is set to be "positive", and a sign of the curvature radius of the surface that is convex toward the eyepoint side is set to be "negative". Table 1 also shows the optical member PP and the eyepoint EP.

In Table 1, regarding the variable surface spacing in the case of diopter adjustment, the symbol dd [ ] is used, the surface number of the spacing on the side of the display element is assigned in [ ], and is noted in the column of the surface spacing d. Table 2 shows a value of the variable surface spacing at each diopter. The term "dpt" in Table 2 means a diopter.

In Table 1, the symbol * is attached to the surface numbers of the aspherical surfaces. In the optical system 20 of the present example, the third surface (surface number 3) to the twelfth surface (surface number 12) are aspherical surfaces. Regarding the aspherical surface, the numerical values of the paraxial curvature radius are noted in the column of the curvature radius r.

In Table 3, the terms "KA" and "Am" represent numerical values of the aspherical coefficient for each aspherical surface. It should be noted that m is an integer of 3 or more and varies depending on the surface. For example, in the present example, m=4, 6, 8, . . . , 20. The "E±n" (n: an integer) in numerical values of the aspherical coefficients of Table 3 indicates "$\times 10^{\pm n}$". The KA and Am are the aspherical coefficients in the aspherical surface expression represented by the following expression.

$$Zd = C \times h^2 / \{1 + (1 - KA \times C^2 \times h^2)^{1/2}\} + \sum Am \times h^m$$

In the above-mentioned expression, Zd is a depth of the aspherical surface (a length of the perpendicular line drawn from a point on the aspherical surface at the height h to a plane which is perpendicular to the optical axis and with which the aspherical apex is in contact), h is a height (a distance from the optical axis to the lens surface), C is a reciprocal of the paraxial curvature radius, and KA and Am are spherical coefficients. Σ in the above-mentioned expression means a sum with respect to m.

In the data of each table, the unit of the length is millimeter (mm). In addition, the optical system can be used even with proportional enlargement or proportional reduction. Thus, other appropriate units can also be used. Further, each of the following tables shows numerical values rounded off to predetermined decimal places.

TABLE 1

| Surface number | r | d | Nd | vd |
|---|---|---|---|---|
| 1 | ∞ | 0.7000 | 1.51900 | 64.90 |
| 2 | ∞ | 4.0000 | | |
| *3 | −13.4700 | 1.6000 | 1.63351 | 23.63 |
| *4 | −20.0005 | dd[4] | | |
| *5 | 20.6442 | 4.0000 | 1.53409 | 55.87 |
| *6 | −16.3058 | 0.2061 | | |
| *7 | −28.2309 | 4.8000 | 1.53409 | 55.87 |
| *8 | −10.2911 | 1.6735 | | |
| *9 | −10.9797 | 1.9253 | 1.63351 | 23.63 |
| *10 | 15.4901 | 1.0670 | | |
| *11 | 53.7069 | 6.8008 | 1.85108 | 40.12 |
| *12 | −14.6457 | 18.5000 | | |
| 13(EP) | ∞ | | | |

TABLE 2

| Diopter adjustment | −1 dpt | −4.5 dpt | +2.5 dpt |
|---|---|---|---|
| dd[4] | 1.7368 | 2.8559 | 0.2979 |

TABLE 3

| Surface number 3 | |
|---|---|
| KA | 1.0000000E+00 |
| A4 | −6.3723853E−05 |
| A6 | 1.8706253E−05 |
| A8 | −3.6344236E−07 |
| A10 | 4.0567640E−09 |
| A12 | −5.7017587E−11 |
| A14 | 5.5768112E−13 |
| A16 | 1.0549800E−15 |
| A18 | −4.8665226E−17 |
| A20 | 2.0712328E−19 |
| **Surface number 4** | |
| KA | 1.0000000E+00 |
| A4 | −1.4778114E−05 |
| A6 | 6.1960997E−06 |
| A8 | 1.4761325E−07 |
| A10 | −6.7104127E−09 |
| A12 | 5.7511737E−11 |
| A14 | 3.0492477E−13 |
| A16 | −3.8533342E−15 |
| A18 | −3.1972708E−17 |
| A20 | 3.2486176E−19 |
| **Surface number 5** | |
| KA | 1.0000000E+00 |
| A4 | −1.3683602E−04 |
| A6 | 1.7973041E−06 |
| A8 | −3.3579624E−08 |
| A10 | −1.9202314E−11 |
| A12 | 2.1245734E−12 |
| A14 | 3.5775140E−14 |
| A16 | −3.7491852E−16 |

TABLE 3-continued

| | |
|---|---|
| A18 | −8.0686000E−19 |
| A20 | 1.1703986E−20 |
| Surface number 6 | |
| KA | 1.0000000E+00 |
| A4 | 8.8979927E−04 |
| A6 | −7.3361237E−06 |
| A8 | −2.7056530E−08 |
| A10 | 8.7723941E−11 |
| A12 | 4.3212131E−12 |
| A14 | −4.9243044E−15 |
| A16 | −1.5183528E−16 |
| A18 | 7.5391219E−19 |
| A20 | −4.0884255E−21 |
| Surface number 7 | |
| KA | 1.0000000E+00 |
| A4 | 6.2631914E−04 |
| A6 | −2.3247038E−06 |
| A8 | −4.9936368E−08 |
| A10 | 4.0885085E−10 |
| A12 | 1.2389327E−12 |
| A14 | −4.1807039E−14 |
| A16 | 5.0519423E−16 |
| A18 | −3.6301207E−18 |
| A20 | 3.8364461E−21 |
| Surface number 8 | |
| KA | 1.0000000E+00 |
| A4 | 2.6659619E−04 |
| A6 | 2.7304147E−06 |
| A8 | −3.6775232E−08 |
| A10 | 1.9571631E−10 |
| A12 | 3.2886755E−12 |
| A14 | 4.4356042E−16 |
| A16 | −5.6504501E−16 |
| A18 | −2.8418986E−19 |
| A20 | 3.2355755E−20 |
| Surface number 9 | |
| KA | 1.0000000E+00 |
| A4 | 2.5592496E−04 |
| A6 | −3.6857306E−06 |
| A8 | −7.0849577E−09 |
| A10 | 2.4234197E−10 |
| A12 | 1.9641352E−12 |
| A14 | 8.1833821E−15 |
| A16 | −3.8634681E−16 |
| A18 | −2.1245718E−18 |
| A20 | 3.4147608E−20 |
| Surface number 10 | |
| KA | 1.0000000E+00 |
| A4 | −2.8641085E−04 |
| A6 | 2.8617238E−07 |
| A8 | 2.5225879E−09 |
| A10 | 1.6181260E−11 |
| A12 | 3.0566941E−14 |
| A14 | −3.9218589E−15 |
| A16 | 8.5638153E−18 |
| A18 | 1.4461328E−19 |
| A20 | −5.5671986E−22 |
| Surface number 11 | |
| KA | 1.0000000E+00 |
| A4 | −6.2989996E−05 |
| A6 | −1.0072725E−07 |
| A8 | 2.6250221E−09 |
| A10 | 1.1273716E−11 |
| A12 | −1.3963483E−13 |
| A14 | −1.9714868E−15 |
| A16 | 8.5171905E−18 |

TABLE 3-continued

| | |
|---|---|
| A18 | 1.2296745E−19 |
| A20 | −5.5902884E−22 |
| Surface number 12 | |
| KA | 1.0000000E+00 |
| A4 | 1.3298085E−05 |
| A6 | −1.7580027E−07 |
| A8 | 3.4082770E−09 |
| A10 | 4.1429711E−12 |
| A12 | −9.0204523E−14 |
| A14 | −2.0295079E−16 |
| A16 | −3.6404378E−18 |
| A18 | 5.7178056E−20 |
| A20 | −8.9925952E−23 |

Sufficiency of Conditional Expression

In a case where the lenses L1 to L5 are composed of a PC lens, the following description shows that the optical system 20 of the present example satisfies Conditional Expressions (1) to (3).

(1) Conditional Expression (1)

In the optical system 20 according to the present example, the thickness dL1 of the lens on the optical axis is 1.5999952, the value OH8 of 40% of the maximum length of the image display region of the display element is 6.4, and the thickness dL1H of the lens at the height OH8 from the optical axis in the optical axis direction is 1.5999952, and the linear expansion coefficient ρ1 of the lens is 6.6 ($10^{-5}$/K). Therefore, $|dL1-dL1H|\times\rho1/OH8$ is 0.459442695. Consequently, the optical system 20 of the present example satisfies the condition of $0.1<|dL1-dL1H|\times\rho1/OH8<1$.

(2) Conditional Expression (2)

In the optical system 20 according to the present example, a focal length f20 of the first lens group at a temperature of 20 degrees is −71.956257, a focal length f40 of the first lens group at a temperature of 40 degrees is −72.202079, and a composite focal length fe of the first lens group and the second lens group in the case of a temperature of 20 degrees and a diopter of −1 dpt is 18.0304871. Therefore, $|f20-f40|/fe$ is 0.013633686. Consequently, the optical system 20 of the present example satisfies the condition of $0.001<|f20-f40|/fe<0.05$.

(3) Conditional Expression (3)

In the optical system 20 according to the present example, a distance doL1 on the optical axis from the display surface of the display element to the apex of the surface of the first lens group on the side of the display element is 4.7, and a composite focal length fe of the first lens group and the second lens group in the case of a temperature of 20 degrees and the diopter of −1 dpt is 18.0304871. Therefore, doL1/fe is 0.260669608. Consequently, the optical system 20 of the present example satisfies $0.15<doL1/fe<0.4$.

Regarding Conditional Expression (4), by using a graphite sheet as the heat discharging member, the condition of jA>200 (W/mk) can be satisfied. The thermal conductivity of the graphite sheet is in a range of approximately 230 to 400 [W/mk].

Regarding Conditional Expression (5), for example, in a case where the first holding frame 30 is composed of a glass fiber reinforced PC (for example, a PC which has a composition of glass fiber 30%) and the base material of the double-sided tapes 34F and 34R is composed of PET, jFave is approximately 0.19 to 0.3 (the thermal conductivity of the glass fiber reinforced PC is 0.3 [W/mk], and the thermal conductivity of PET is calculated as 0.2 to 0.3 [W/mk]). Consequently, the condition of jFave<0.5 can be satisfied.

Modification Examples

First Holding Frame

In the EVF 1 of the above-mentioned embodiment, the first holding frame 30 that holds the display element 10 and the first lens group G1 is composed of one part, but the first holding frame 30 may be composed of a plurality of parts. For example, the holding member (display element holding member) that holds the display element 10 and the holding member (first lens group holding member) that holds the first lens group G1 may be composed of separate parts. In such a case, both are integrated in a case of assembly. For example, the members are cemented by attaching or the like to be integrated.

Diopter Adjustment Unit

In the EVF 1 of the above-mentioned embodiment, a so-called lead screw mechanism is employed as a mechanism for moving the first holding frame 30, but the mechanism for moving the first holding frame 30 is not limited thereto. The first holding frame 30 may be moved back and forth along the optical axis Z. Further, the configuration is not limited to manual operation, and a configuration may be used in which the object is moved by using a motor or the like.

Finder Device

In the above-mentioned embodiment, the case where the present invention is applied to the EVF of the digital camera has been described as an example, but the application of the present invention is not limited thereto. For example, the present invention can be applied to a video camera or the like. The present invention can also be applied to a so-called externally mounted finder.

The technique of the present invention has been hitherto described through embodiments and examples, but the technique of the present invention is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

EXPLANATION OF REFERENCES

- 1: electronic view finder (EVF)
- 10: display element
- 11: frame
- 12: flexible printed circuit (FPC)
- 13: graphite sheet
- 14: bracket
- 20: optical system
- 30: first holding frame
- 31: partition wall of first holding frame
- 31F: front side edge surface of partition wall
- 31R: rear side edge surface of partition wall
- 32: display element holding part
- 33: first lens group holding part
- 34F: double-sided tape
- 34R: double-sided tape
- 35: nut holding part
- 40: second holding frame
- 41: shaft supporting unit
- 42: screw rod supporting portion
- 50: diopter adjustment unit
- 51: guiding unit
- 51A: guiding rod
- 51B: sliding portion
- 51C: guiding hole
- 52: driving unit
- 52A: screw rod
- 52B: nut member
- 52C: click mechanism
- 53: diopter adjustment dial
- EP: eyepoint
- G1: first lens group
- G2: second lens group
- IP: image display surface
- L1: lens
- L2: lens
- L3: lens
- L4: lens
- L5: lens
- PP: optical member
- Z: optical axis
- d1: thickness of double-sided tape
- d2: thickness of partition wall
- d3: thickness of double-sided tape

What is claimed is:

1. A finder device comprising:

a display element;

an optical system that includes at least a first lens group and a second lens group in order from a side of the display element;

a first lens group holding member that holds the first lens group to seal a space between the display element and the first lens group;

a second lens group holding member that holds the second lens group; and a diopter adjustment unit that adjusts a diopter by integrally moving the display element and the first lens group relative to the second group, wherein the first lens group satisfies the following conditional expression:

$$0.001<|f20-f40|/fe<0.05,$$

where f20 is a focal length (millimeter) of the first lens group at a temperature of 20 degrees, f40 is a focal length (millimeter) of the first lens group at a temperature of 40 degrees, and fe is a composite focal length (millimeter) of the first lens group and the second lens group in a case where a temperature is 20 degrees and a diopter is −1 dpt.

2. The finder device according to claim 1, wherein the first lens group holding member and the second lens group holding member are thermally separated from each other.

3. The finder device according to claim 2, wherein the first lens group holding member and the second lens group holding member are spatially separated and thermally separated.

4. The finder device according to claim 1, wherein in the first lens group, a lens closest to the side of the display element satisfies the following conditional expression:

$$0.1<|dL1-dL1H|\times\rho1/OH8<1,$$

where dL1 is a thickness (millimeter) of the lens on an optical axis,

OH8 is a value of 40% of a maximum length (millimeter) of an image display region of the display element, dL1H is a thickness (millimeter) of the lens in an optical axis direction at a height of OH8 from the optical axis, and ρ1 is a linear expansion coefficient ($10^{-5}$/K) of the lens.

5. The finder device according to claim 1, wherein the first lens group satisfies the following conditional expression:

$$0.15<doL1/fe<0.4,$$

where doL1 is a distance (millimeter) on an optical axis from a display surface of the display element to an apex of a surface of the first lens group on the side of the display element.

6. The finder device according to claim 1, further comprising a heat discharging member that comes into contact with the display element within a movable range of the display element to discharge heat of the display element.

7. The finder device according to claim 6, wherein the heat discharging member satisfies the following conditional expression:

$$jA>200,$$

where jA is a thermal conductivity (W/mK) of the heat discharging member.

8. The finder device according to claim 6, wherein the heat discharging member is composed of a band-like body which has flexibility and of which one end is connected to the display element.

9. The finder device according to claim 8, wherein the heat discharging member is provided on a flexible printed circuit which is connected to the display element.

10. The finder device according to claim 1, wherein the first lens group holding member holds the display element.

11. The finder device according to claim 10, wherein the diopter adjustment unit adjusts a diopter by moving the first lens group holding member relative to the second lens group holding member.

12. The finder device according to claim 11, wherein the diopter adjustment unit includes a guiding unit that guides movement of the first lens group holding member, and the guiding unit is provided in the second lens group holding member.

13. A finder device comprising:

a display element;

an optical system that includes at least a first lens group and a second lens group in order from a side of the display element;

a first lens group holding member that holds the first lens group to seal a space between the display element and the first lens group;

a second lens group holding member that holds the second lens group; and a diopter adjustment unit that adjusts a diopter by integrally moving the display element and the first lens group relative to the second lens group, wherein a member, which is interposed between the display element and the first lens group, satisfies the following conditional expression:

$$jFave<0.5,$$

where jFave is an average value of thermal conductivities (W/mK) of the member which is interposed between the display element and the first lens group.

* * * * *